US012579537B2

(12) United States Patent
Agrawal et al.

(10) Patent No.: US 12,579,537 B2
(45) Date of Patent: Mar. 17, 2026

(54) DIGITAL WALLET BALANCE DISPLAY IN AN ELECTRONIC DEVICE

(71) Applicant: MOTOROLA MOBILITY LLC, Wilmington, DE (US)

(72) Inventors: Amit Kumar Agrawal, Bangalore (IN); Krishnan Raghavan, Bangalore (IN); Hariprasad Shanbhogue Alampady, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 97 days.

(21) Appl. No.: 18/472,721

(22) Filed: Sep. 22, 2023

(65) Prior Publication Data

US 2025/0104046 A1 Mar. 27, 2025

(51) Int. Cl.
*G06Q 20/36* (2012.01)
*G06Q 20/32* (2012.01)

(52) U.S. Cl.
CPC ....... *G06Q 20/363* (2013.01); *G06Q 20/3224* (2013.01)

(58) Field of Classification Search
None
See application file for complete search history.

(56) References Cited

U.S. PATENT DOCUMENTS

| 8,170,527 | B2 * | 5/2012 | Granucci | G06Q 20/322 |
| | | | | 455/406 |
| 8,452,257 | B2 * | 5/2013 | Granucci | G06Q 20/3221 |
| | | | | 455/406 |
| 8,639,621 | B1 * | 1/2014 | Ellis | G06Q 20/36 |
| | | | | 705/41 |
| 8,645,971 | B2 * | 2/2014 | Carlson | H04M 15/68 |
| | | | | 705/17 |
| 8,924,292 | B1 * | 12/2014 | Ellis | G06K 7/1413 |
| | | | | 705/41 |
| 8,989,712 | B2 * | 3/2015 | Wentker | H04W 4/80 |
| | | | | 455/414.1 |
| 9,811,821 | B2 * | 11/2017 | Koeppel | H04W 64/003 |
| 9,911,123 | B2 * | 3/2018 | Van Os | H04M 1/72403 |

(Continued)

OTHER PUBLICATIONS

M. Pasquet, N. Faye and J. Reynaud, "Pay2you places: The mobile payment with geo-location," 2014 International Conference on Collaboration Technologies and Systems (CTS), Minneapolis, MN, USA, 2014, pp. 211-216. (Year: 2014).*

*Primary Examiner* — Mohammad Z Shaikh
(74) *Attorney, Agent, or Firm* — Isidore PLLC

(57) ABSTRACT

An electronic device, a method and a computer program product for indicating a digital wallet balance from at least one digital wallet account. The method includes detecting, via at least one processor, a trigger to initiate indication of a digital wallet balance. In response to detecting the trigger to initiate indication of the digital wallet balance, the method further includes sending a balance inquiry for the digital wallet balance of each of the at least one digital wallet account and receiving, in response to the balance inquiry, the digital wallet balance for each of the at least one digital wallet account. The method further includes converting the digital wallet balance into a first balance indicator corresponding to the digital wallet balance and outputting the first balance indicator within a first graphical user interface presented on the display.

20 Claims, 8 Drawing Sheets

(56) References Cited

U.S. PATENT DOCUMENTS

| | | | | |
|---|---|---|---|---|
| 9,928,547 | B2 * | 3/2018 | Del Vecchio | G06Q 40/02 |
| 9,953,367 | B2 * | 4/2018 | Del Vecchio | H04L 67/52 |
| 10,089,609 | B2 * | 10/2018 | Zhang | G06Q 30/0226 |
| 10,169,812 | B1 * | 1/2019 | Bajgier | G06Q 20/108 |
| 10,296,972 | B2 * | 5/2019 | Van Heerden | G06Q 40/02 |
| 10,311,422 | B2 * | 6/2019 | Koeppel | G06Q 20/3221 |
| 10,339,521 | B1 * | 7/2019 | Bodkin | G06Q 20/322 |
| 10,839,376 | B1 * | 11/2020 | Kurani | G06Q 20/36 |
| 10,997,592 | B1 * | 5/2021 | Kurani | G06Q 20/3821 |
| 11,023,877 | B2 * | 6/2021 | Koeppel | G07F 19/206 |
| 11,288,660 | B1 * | 3/2022 | Kurani | G06Q 20/3223 |
| 11,392,909 | B2 * | 7/2022 | Tomida | G06Q 20/102 |
| 11,423,393 | B1 * | 8/2022 | Kurani | G06Q 20/367 |
| 11,487,623 | B2 * | 11/2022 | Nishikai | G06F 11/302 |
| 11,704,754 | B2 * | 7/2023 | Tax | H04W 4/029 |
| | | | | 705/26.7 |
| 11,948,211 | B2 * | 4/2024 | Tax | H04W 4/029 |
| 12,014,339 | B1 * | 6/2024 | Bowers | G06Q 20/3263 |
| 12,082,069 | B1 * | 9/2024 | Hartman | H04W 4/021 |
| 2008/0006685 | A1 * | 1/2008 | Rackley, III | G06Q 40/00 |
| | | | | 235/379 |
| 2008/0167000 | A1 * | 7/2008 | Wentker | G06Q 20/10 |
| | | | | 455/408 |
| 2008/0208741 | A1 * | 8/2008 | Arthur | G06Q 20/105 |
| | | | | 705/41 |
| 2010/0114724 | A1 * | 5/2010 | Ghosh | G06Q 20/20 |
| | | | | 705/16 |
| 2012/0136732 | A1 * | 5/2012 | McMillen | G06Q 20/105 |
| | | | | 705/16 |
| 2012/0323762 | A1 * | 12/2012 | Kapur | G06Q 20/4037 |
| | | | | 705/35 |
| 2013/0036048 | A1 * | 2/2013 | Campos | G06Q 20/16 |
| | | | | 705/41 |
| 2013/0046589 | A1 * | 2/2013 | Grigg | G06Q 30/02 |
| | | | | 705/14.1 |
| 2014/0136349 | A1 * | 5/2014 | Dave | G06Q 20/12 |
| | | | | 705/16 |
| 2015/0193869 | A1 * | 7/2015 | Del Vecchio | G06Q 40/02 |
| | | | | 705/42 |
| 2015/0254698 | A1 * | 9/2015 | Bondesen | G06Q 20/36 |
| | | | | 705/14.17 |
| 2015/0254699 | A1 * | 9/2015 | Bondesen | G06Q 20/20 |
| | | | | 705/14.17 |
| 2015/0254700 | A1 * | 9/2015 | Jain | G06Q 30/0215 |
| | | | | 705/14.19 |
| 2017/0068952 | A1 * | 3/2017 | Brockmann | G06Q 20/4014 |
| 2017/0091764 | A1 * | 3/2017 | Lloyd | G06Q 20/4015 |
| 2017/0169403 | A1 * | 6/2017 | Zhang | G06Q 20/065 |
| 2019/0295064 | A1 * | 9/2019 | Malo | G06Q 20/201 |
| 2021/0090063 | A1 * | 3/2021 | Ahmed | G06Q 20/3224 |
| 2021/0090663 | A1 * | 3/2021 | Son | G11C 8/14 |
| 2022/0164789 | A1 * | 5/2022 | Gosalia | G06Q 20/3674 |
| 2022/0180458 | A1 * | 6/2022 | Tax | G06Q 20/3224 |
| 2024/0169332 | A1 * | 5/2024 | Kurian | G07F 19/203 |
| 2024/0354735 | A1 * | 10/2024 | Kell | G06Q 20/38215 |

* cited by examiner

| Balance Ranges 370 | Balance Indicators 380 | | |
| --- | --- | --- | --- |
| | Symbol 510 | Alternate Symbol 520 | Area 466 Color |
| Low Aggregate BR 371 | $ | $ | Red |
| Low Cash BR 372 | $ | $ | Red |
| Low Available Credit BR 373 | C | c | Red |
| Moderate Aggregate BR 374 | $$ | $$ | Yellow |
| Moderate Cash BR 375 | $$ | $$ | Yellow |
| Moderate Available Credit BR 376 | CC | cC | Yellow |
| High Aggregate BR 377 | $$$ | $$$ | Green |
| High Cash BR 378 | $$$ | $$$ | Green |
| High Available Credit BR 379 | CCC | cCC | Green |

600

602 Start

604 Identify Trigger For Calculating And Outputting Digital Wallet Balances

606 Send Balance Inquiry To Digital Wallet Computer System(s)

608 Receive Balance Inquiry Response From Digital Wallet Computer System(s)

610 Identify Cash And Available Credit For Each Digital Wallet Account

612 Calculate Overall Cash, Available Credit And Aggregate Balances

614 Retrieve Threshold Balances

616 Assign Overall Balances To Balance Ranges

618 Convert Balance Ranges To Balance Indicators

620 Output GUI With Balance Indicators On Display

End    640

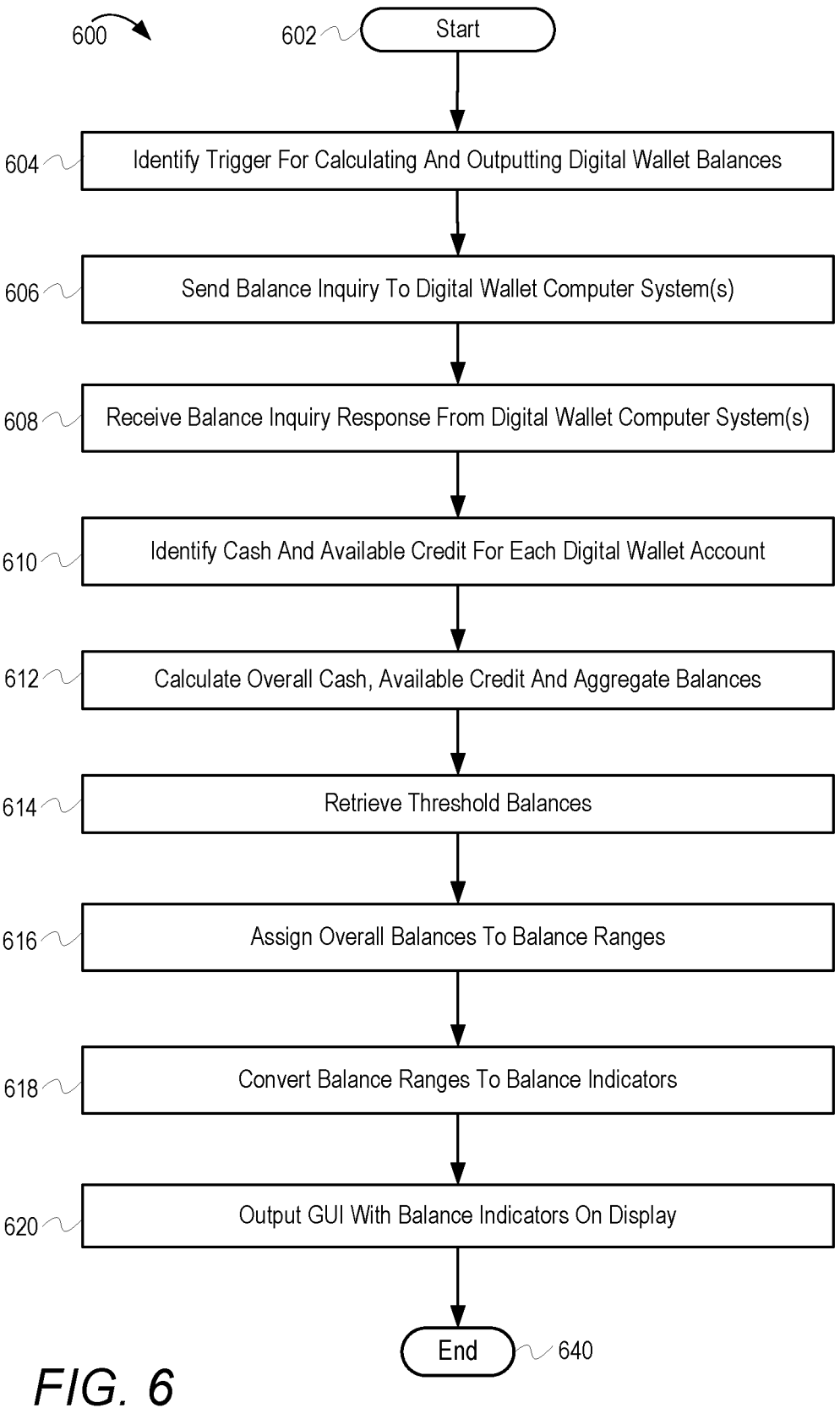

*FIG. 6*

DIGITAL WALLET BALANCE DISPLAY IN AN ELECTRONIC DEVICE

BACKGROUND

1. Technical Field

The present disclosure generally relates to electronic devices and in particular to digital wallets used with an electronic device.

2. Description of the Related Art

Electronic devices, such as cell phones, tablets, and laptops, are widely used for video, voice, and text communication and data transmission. These electronic devices are also used to facilitate electronic transactions. For example, a digital wallet is a financial transaction application that enables an electronic device to complete payment and financial transactions with merchants and other individuals. A digital wallet can use the wireless capabilities of an electronic device to transmit payment data from the electronic device to a point of sale terminal that is designed to read the payment data and complete transactions. Each digital wallet can access one or more of stored cash, credit card, debit card, or bank account information utilized to complete the transactions, and the digital wallet can store user payment information in a secure manner. Unfortunately, it is difficult for an electronic device user to quickly determine if they have enough money in their financial account(s) to complete a transaction. An electronic device user may have to login to several digital wallets to check the exact balance of each one, which is tedious and time consuming. In addition, it is undesirable for the user of an electronic device to display balances in their accounts in a public setting.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 is an example table of balance ranges and balance indicators associated with digital wallet balances, according to one or more embodiments;

FIG. 6 depicts a flowchart of a method by which an electronic device provides a visual indication of a digital wallet balance from at least one digital wallet account, according to one or more embodiments;

DETAILED DESCRIPTION

Figure 1:
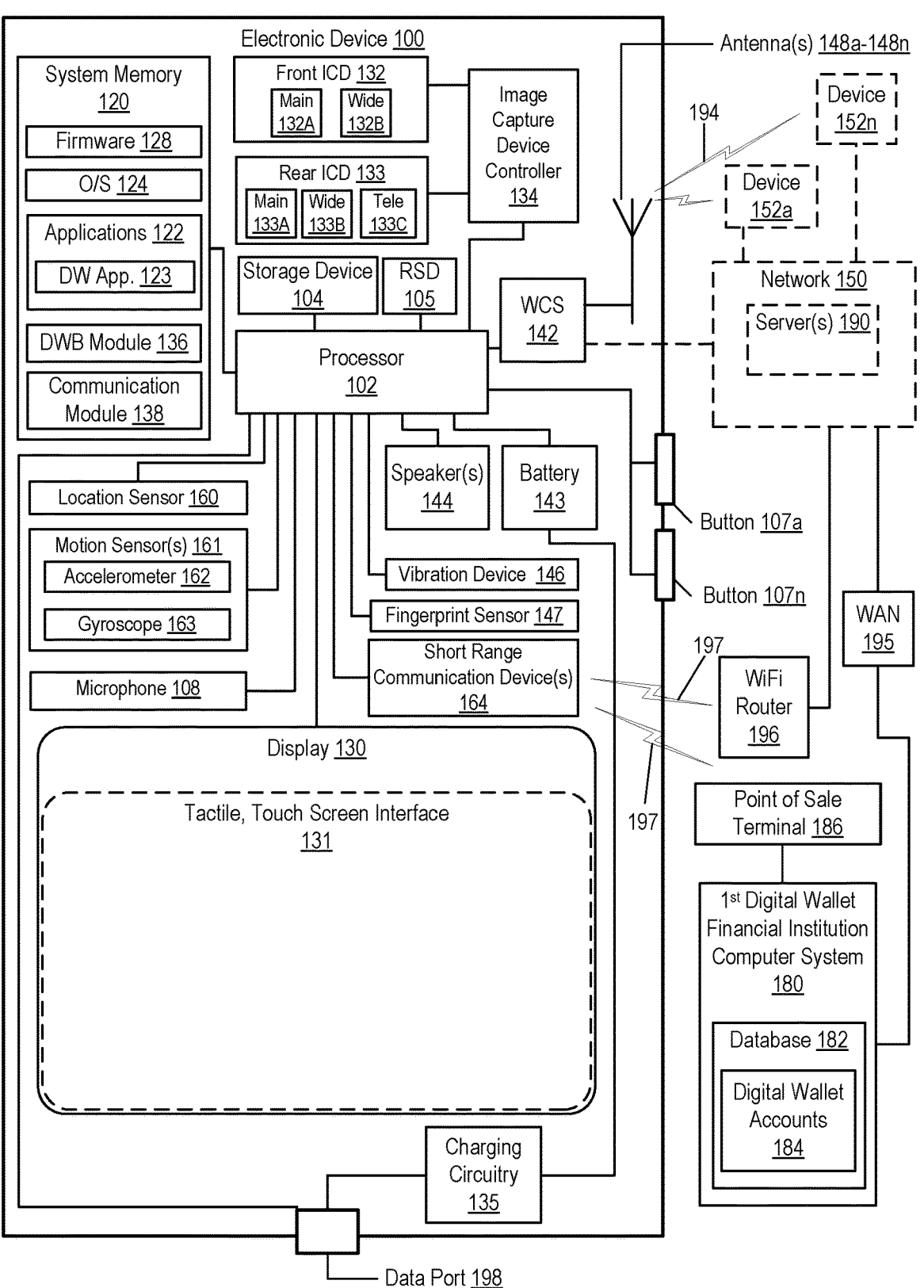
FIG. 1 depicts an example electronic device within which various aspects of the disclosure can be implemented, according to one or more embodiments.

According to one aspect of the disclosure, the illustrative embodiments provide an electronic device, a method, and a computer program product for indicating a digital wallet balance from at least one digital wallet account. In a first embodiment, an electronic device includes a display, a communication system, and a memory having stored thereon a digital wallet balance (DWB) module for indicating a digital wallet balance from at least one digital wallet account. The electronic device includes at least one processor that is communicatively coupled to the display, the communication system, and the memory. The at least one processor executes program code of the digital wallet balance module, which enables the electronic device to detect a trigger to initiate indication of the digital wallet balance. In response to detecting the trigger to initiate indication of the digital wallet balance, the at least one processor sends a balance inquiry for the digital wallet balance of each of the at least one digital wallet account. The at least one processor receives, in response to the balance inquiry, the digital wallet balance for each of the at least one digital wallet accounts and converts the digital wallet balance into a first balance indicator corresponding to the digital wallet balance. The at least one processor outputs the first balance indicator within a first graphical user interface (GUI) presented on the display.

According to another embodiment, the method includes detecting, via at least one processor, a trigger to initiate indication of a digital wallet balance. In response to detecting the trigger to initiate indication of the digital wallet balance, the method further includes sending a balance inquiry for the digital wallet balance of each of the at least one digital wallet account and receiving, in response to the balance inquiry, the digital wallet balance for each of the at least one digital wallet account. The method further includes converting the digital wallet balance into a first balance indicator corresponding to the digital wallet balance and outputting the first balance indicator within a first graphical user interface (GUI) presented on the display.

According to an additional embodiment, a computer program product includes a computer readable storage device having stored thereon program code that, when executed by at least one processor of an electronic device having a display and a communication system, the program code enables the electronic device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer, and a communication device, etc. It is appreciated that electronic device 100 can be other types of devices that include capability to receive an incoming communication and one or more sensors, e.g., a camera, for identifying different users of the device. Electronic device 100 includes processor 102, which is communicatively coupled to storage device 104, system memory 120, input devices, (introduced below), output devices, such as display 130, and image capture device (ICD) controller 134. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102. Processor 102 can include processor resources such as a central processing unit (CPU) that support computing, classifying, processing and transmitting of data and information. Processor 102 can further include graphic processing units (GPU) and digital signal processors (DSP) that also support computing, classifying, processing and transmitting and receiving of data and information.

System memory 120 may be a combination of volatile and non-volatile memory, such as random access memory (RAM) and read-only memory (ROM). System memory 120 can store program code and data associated with firmware 128, an operating system 124, applications 122, digital wallet balance (DWB) module 136, and communication module 138. Applications 122 can include at least one digital wallet or payment application 123 that can be utilized to complete a financial transaction. DWB module 136 includes program code that is executable by processor 102 to enable electronic device 100 to indicate a digital wallet balance from at least one digital wallet account. Communication module 138 includes program code that is executed by processor 102 to enable electronic device 100 to communicate with other external devices and systems.

Although depicted as being separate from applications 122, DWB module 136 and communication module 138 may each be implemented as an application. Processor 102 loads and executes program code stored in system memory 120, including program code associated with applications 122 and program code associated with DWB module 136 and communication module 138. When processed/executed by processor 102, the program code causes or configures electronic device 100 to provide the various functionality described herein.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of DWB module 136 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear cameras 132, 133. As illustrated, electronic device 100 includes several front cameras 132. Electronic device 100 further includes several rear cameras 133. Each front camera 132A and 132B and each rear camera 133A, 133B and 133C is communicatively coupled to ICD controller 134, which is communicatively coupled to processor 102. ICD controller 134 supports the processing of signals from front cameras 132A and 132B and rear cameras 133A, 133B and 133C.

Electronic device 100 can further include data port 198, charging circuitry 135, and battery 143 for providing electrical power to the various electronic components of electronic device 100. Electronic device 100 further includes microphone 108, one or more output devices such as speakers 144, and one or more input buttons 107a-n. Input buttons 107a-n may provide controls for volume, power, and/or image capture devices 132, 133. Microphone 108 can also be referred to as audio input device 108. Microphone 108 can be used to provide biometric data to identify or authenticate a user. Microphone 108 and input buttons 107a-n can also be referred to generally as input devices. Speakers 144 can provide an audio alert to a user, such as a ring tone, during an incoming call to electronic device 100.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150.

In one or more embodiment, wireless network 150 can include one or more servers 190 that support wireless exchange of voice, data, and video and other communication with electronic device 100. Wireless network 150 further allows electronic device 100 to communicate with a first financial institution computer system 180. First financial institution computer system 180 is communicatively coupled to wireless network 150 by a wide area network (WAN) 195, such as the Internet. First financial institution computer system 180 can include a database 182 that stores digital wallet accounts 184 and information about the digital wallet accounts.

Electronic device 100 further includes short range communication device(s) 164. Short-range communication device 164 is a low powered transceiver that can wirelessly communicate with other devices. Short-range communication device(s) 164 can include one or more of a variety of devices supporting different corresponding wireless protocols, such as a near field communication (NFC) device, a Bluetooth device, and/or a wireless fidelity (Wi-Fi) device. Electronic device 100 can also connect wirelessly to wireless network 150 via communication signals 197 transmitted by short-range communication device(s) 164 to and from WiFi router 196, which is communicatively connected to wireless network 150. Short-range communication device(s) 164 can wirelessly communicate with WiFi router 196 via communication signals 197. In one embodiment, electronic device 100 can receive Internet or Wi-Fi based calls via short-range communication device(s) 164. In one embodiment, electronic device 100 can communicate with WiFi router 196 wirelessly via short-range communication device(s) 164. In an embodiment, WCS 142, antennas 148a-148n and short-range communication device(s) 164 collectively provide communication interface(s) of electronic device 100.

Electronic device 100 can further communicate with a point of sale terminal 186 via short-range communication device(s) 164. Short-range communication device(s) 164 can enable wirelessly communication by electronic device 100 with point of sale terminal 186 via exchange of communication signals 197. Point of sale terminal 186 is located at a store or merchant location and facilities digital wallet transactions at the store or merchant. Point of sale terminal 186 can receive wireless payment information from electronic device 100 via communication signals 197. Point of sale terminal 186 can be communicatively coupled to first financial institution computer system 180 by a background network, such as the Internet.

Electronic device 100 further includes vibration device 146, fingerprint sensor 147, location sensor 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data or images to identify or authenticate a user. Location sensor 160 can provide time data and location data about the physical location of electronic device 100. In one embodiment, location sensor 160 can be a global positioning system (GPS) device that uses data received from geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100.

In the description of each of the following figures, reference is also made to specific components illustrated within the preceding figure(s). Similar or same components are presented with the same reference number.

Figure 2:
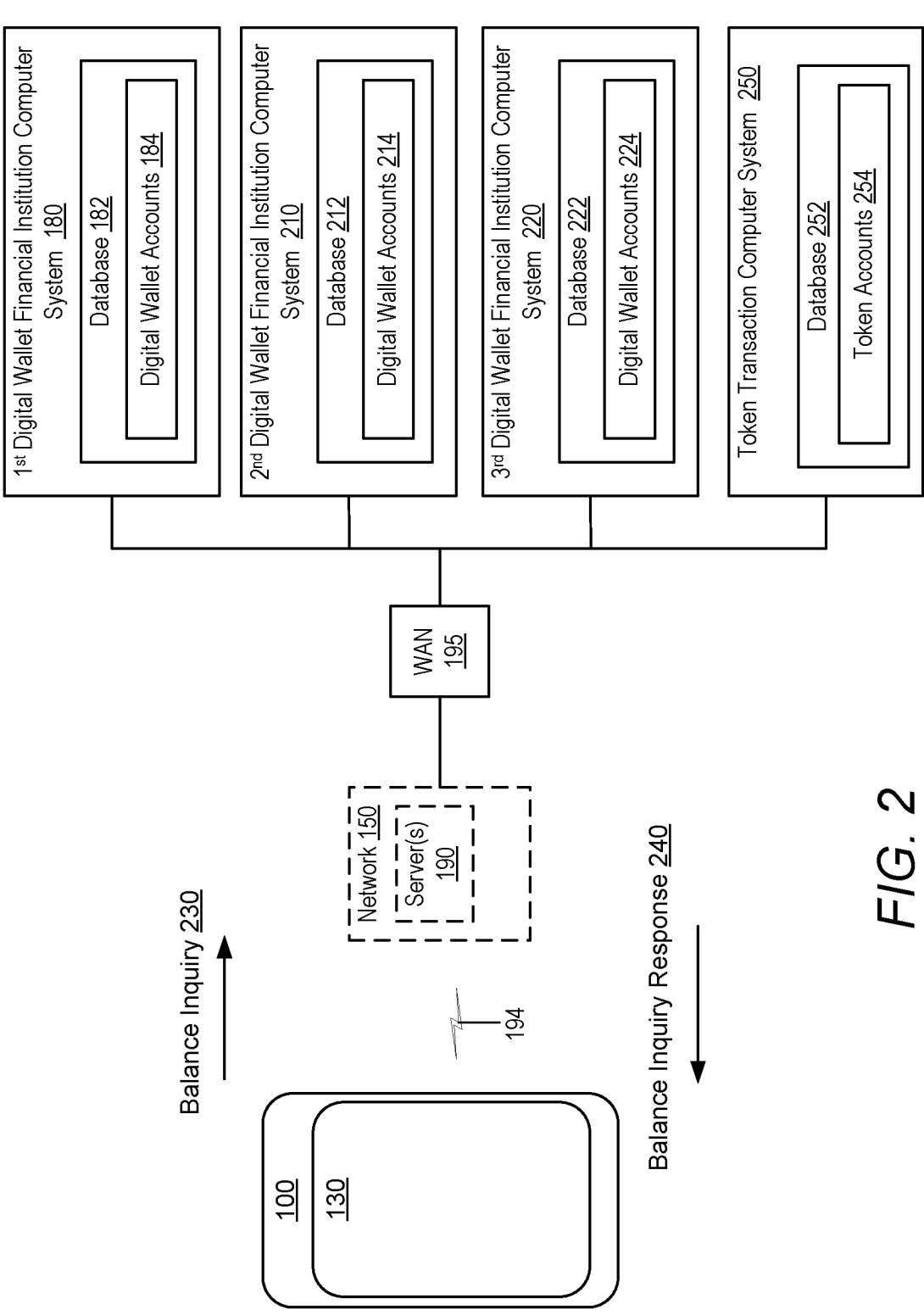
FIG. 2 is an example illustration of an electronic device in communication with several financial institution computer systems, which may store different financial accounts used to complete financial transactions via one or more digital wallets, according to one or more embodiments.

Turning to FIG. 2, electronic device 100 is shown in communication with several financial institution computer systems via wireless communication network 150 and WAN 195. Electronic device 100 can communicate wirelessly with wireless network 150 via transmission and reception of communication signals 194. Communication network 150 includes communication servers 190 that are communicatively connected to a larger, wide area network (WAN) 195, such as the Internet. Electronic device 100 can also establish connection and communicate with wireless network 150 and with WAN 195 via WiFi router 196 and short-range communication device(s) 164. First financial institution computer system 180 includes a database 182 that stores digital wallet accounts 184. Second financial institution computer system 210 includes a database 212 that stores digital wallet accounts 214. Third financial institution computer system 220 includes a database 222 that stores digital wallet accounts 224. Token transaction computer system 250 includes a database 252 that stores token accounts 254. Token accounts 254 contain data and information for tokens that can be used to complete a financial transaction or exchange. A token is a digital asset that is not cash, nor a credit card, nor actual credit, that can be used to complete a financial transaction or exchange. Examples of tokens include fungible items such as crypto-currencies and non-fungible items such as gold and stocks.

According to one aspect of the disclosure, electronic device 100 can send a balance inquiry 230 for each of the digital wallet balances associated with electronic device 100 for each digital wallet account (e.g., digital wallet accounts 184, 214, and 224) and token account 254 at each of the financial institution computer systems (e.g., financial institution computer systems 180, 210 and 220 and token transaction computer system 250). Electronic device 100 can receive, in response to the balance inquiry 230, a balance inquiry response 240 that contains the digital wallet balances for each digital wallet account (e.g. digital wallet accounts 184, 214, and 224 and token account 254) associated with electronic device 100. Electronic device 100 and each of the financial institution computer systems 180, 210 and 220 and token transaction computer system 250 can perform a validation and authentication routine prior to the exchange of data and information to provide account verification and security.

Figure 3:
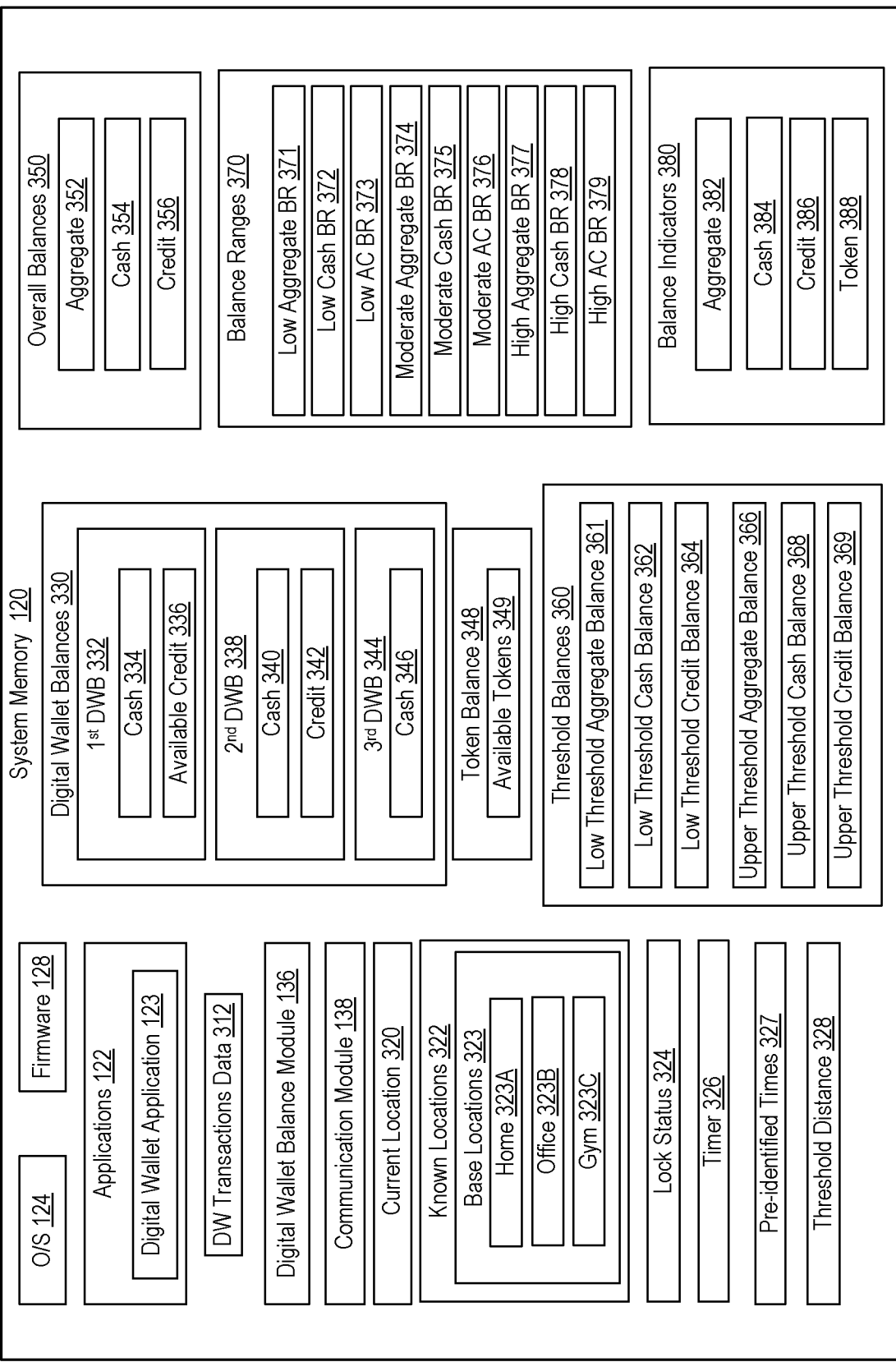
FIG. 3 is a block diagram of example contents of the system memory of the example electronic device of FIG. 1 configured to complete the various processes described herein, according to one or more embodiments.

Referring to FIG. 3, there is shown one embodiment of example contents of system memory 120 of electronic device 100 configured to complete the various processes described herein. System memory 120 includes data, software, and/or firmware modules, including applications 122, operating system 124, firmware 128, DWB module 136, and communication module 138.

Applications 122 include a digital wallet application 123. Digital wallet application 123 includes program code that is executed by processor 102 to enable electronic device 100 to facilitate electronic financial transactions and transfers with other parties. Digital wallet application 123 generates one or more digital wallet transactions data 312 that are stored in a memory region assigned to or associated with digital wallet application 123. DWB module 136 includes program code that is executed by processor 102 to enable electronic device 100 to perform the various features of the present disclosure. In one or more embodiments, DWB module 136 enables electronic device 100 to indicate an aggregate digital wallet balance from one or more digital wallet accounts. In one or more embodiments, execution of DWB module 136 by processor 102 enables/configures electronic device 100 to perform the processes presented in the flowcharts of FIGS. 6, 7 and 8, as will be described below. Communication module 138 enables electronic device 100 to communicate and exchange data with wireless network 150 and/or WAN 195 and with other devices, such as point of sale terminal 186.

System memory 120 further includes current location 320 and known locations 322. Current location 320 is the current location of electronic device 100 as sensed by location sensor 160. Known locations 322 are locations that electronic device 100 is known to frequently be located at. Known locations 322 include base locations 323 that comprise home 323A, office 323B, and gym 323C, as examples. Base locations 323 are pre-identified locations that electronic device 100 is known to be frequently kept at or located at, but from which location the user(s) of electronic device occasionally leaves.

System memory 120 further includes lock status 324 and timer 326. Lock status 324 contains information about whether electronic device 100 is in a locked state or an unlocked state. Timer 326 tracks a time period for presenting a balance indicator on display 130. In one or more embodiments, in response to determining that timer 326 has expired, electronic device 100 removes the balance indicator from the display.

System memory 120 further includes pre-identified times 327 and threshold distance 328. Pre-identified times 327 are specific times during a day during which electronic device 100 is normally moved away from the base locations by at least the threshold distance 328. Threshold distance 328 is a pre-determined minimum distance between current location 320 and one of known locations 322 and is used by electronic device 100 to determine if the electronic device is being moved away from the pre-identified base location.

System memory 120 further includes digital wallet balances 330 and token balance 348. Digital wallet balances 330 are the amounts of cash and available credit that are contained in a digital wallet account that is associated with and accessible by electronic device 100. Digital wallet balances 330 include first digital wallet balance 332, second digital wallet balance 338, and third digital wallet balance 344. Electronic device 100 can receive, in response to the balance inquiry 230, the balance inquiry response 240 that contains the digital wallet balances 332, 338, and 344 and the token balance 348. The balance inquiry 230 is transmitted to the different financial accounts of the device user (or accounts linked to the device for use in completing financial transactions).

First digital wallet balance 332 corresponds to the balance of at least one of digital wallet accounts 184 received from first financial institution computer system 180 and includes a cash balance 334 and an available credit 336 (e.g., a credit card balance). Second digital wallet balance 338 corresponds to the balance of at least one of digital wallet accounts 214 received from second financial institution computer system 210 and includes a cash balance 340 and an available credit 342. In one embodiment, available credit 342 can be an actual credit available from the financial institution that can be utilized towards purchases. In this embodiment, the available credit can be included as a cash credit or presented via a separate indication from cash and the available credit from a user's credit cards. Third digital wallet balance 344 corresponds to the balance of at least one of digital wallet accounts 224 received from third financial institution computer system 220 and includes a cash balance 346. Token balance 348 corresponds to the balance received from a token transaction computer system 250 and includes an available amount of tokens (e.g., bitcoins or other crypto-currency) 349 that can be used to complete a financial transaction.

System memory 120 further includes overall balances 350. Overall balances 350 include an overall aggregate balance 352, an overall cash balance 354 and an overall available credit 356. Overall balances 350 can also include an overall token value (not shown), where/when tokens are available to the user. Overall cash balance 354 is calculated by summing the cash balances from each digital wallet account (i.e., cash balance 334, cash balance 340 and cash balance 346). Overall available credit 356 is calculated by summing the available credit from each digital wallet account (i.e., available credit 336 and available credit 342). Overall aggregate balance 352 is calculated by the sum of overall cash balance 354 and overall available credit 356.

System memory 120 further includes threshold balances 360. Threshold balances 360 comprise low threshold aggregate balance 361, low threshold cash balance 362, and low threshold available credit balance 364. Low threshold aggregate balance 361 is the value of an aggregate balance amount, below which the aggregate balance is identified as being low or insufficient. Low threshold cash balance 362 is the value of a cash balance amount, below which the cash balance is identified as being low or insufficient. Low threshold available credit balance 364 is the value of an available credit balance amount, below which the available credit balance is identified as being low or insufficient.

Threshold balances 360 further comprise upper threshold aggregate balance 366, upper threshold cash balance 368, and upper threshold available credit balance 369. Upper threshold aggregate balance 366 is the value of an aggregate balance amount, above which the aggregate balance is identified as being high or sufficient. Upper threshold cash balance 368 is the value of a cash balance amount, above which the cash balance is identified as being high or sufficient. Upper threshold available credit balance 369 is the value of an available credit balance amount, above which the available credit balance is identified as being high or sufficient.

In one embodiment, electronic device 100 can automatically select or set low threshold aggregate balance 361, low threshold cash balance 362, low threshold available credit balance 364, upper threshold aggregate balance 366, upper threshold cash balance 368, and upper threshold available credit balance 369. In an example embodiment, electronic device 100 can set the low threshold aggregate balance 361 and the upper threshold aggregate balance 366 as percentages of an average of overall aggregate balance 350 that is monitored for a period of time. Similarly, electronic device 100 can set the low threshold cash balance 362 and the upper threshold cash balance 368 as percentages of an average of overall cash balance 354 that is monitored for a period of time. Electronic device 100 can set the low threshold available credit balance 364 and the upper threshold available credit balance 369 as percentages of an average of overall available credit balance 356 that is monitored for a period of time. In another embodiment, an electronic device user can select actual dollar amount values (or appropriate currency) for the low threshold balances and the upper threshold balances.

System memory 120 further includes balance ranges 370 and balance indicators 380. Balance ranges 370 include low aggregate balance range 371, low cash balance range 372, low available credit balance range 373, moderate aggregate balance range 374, moderate cash balance range 375, moderate available credit balance range 376, high aggregate balance range 377, high cash balance range 378, and high available credit balance range 379. Aggregate balance ranges 371, 374, and 377 are calculated using overall aggregate balance 352, low threshold aggregate balance 361 and upper threshold aggregate balance 366.

Electronic device 100 can identify or assign the overall aggregate balance 352 to one of the balance ranges 371, 374, and 377. For example, if the overall aggregate balance 352 is less than low threshold aggregate balance 361, electronic device 100 can identify the overall aggregate balance 352 as being in the low aggregate balance range 371. If the overall aggregate balance 352 is greater than upper threshold aggregate balance 366, electronic device 100 can identify the overall aggregate balance 352 as being in the high aggregate balance range 377. If the overall aggregate balance 352 is between low threshold aggregate balance 361 and upper threshold aggregate balance 366, electronic device 100 can identify the overall aggregate balance 352 as being in the moderate aggregate balance range 374.

Cash balance ranges 372, 375, and 378 are calculated using overall cash balance 354, low threshold cash balance 362 and upper threshold cash balance 368. Available credit balance ranges 373, 376, and 379 are calculated using overall available credit balance 356, low threshold available credit balance 364, and upper threshold available credit balance 369. Electronic device 100 can also identify the respective balance ranges corresponding to overall cash balance 354 and overall available credit balance 356.

Balance indicators 380 include aggregate balance indicator 382, cash balance indicator 384 and available credit indicator 386. In one or more embodiments, balance indicators 380 can also include available token indicator 388. In one embodiment, electronic device 100 can convert the digital wallet balances into balance indicators 380 that correspond to the digital wallet balances and present the balance indicators 380 within a graphical user interface (GUI) shown on display 130.

Figure 4:
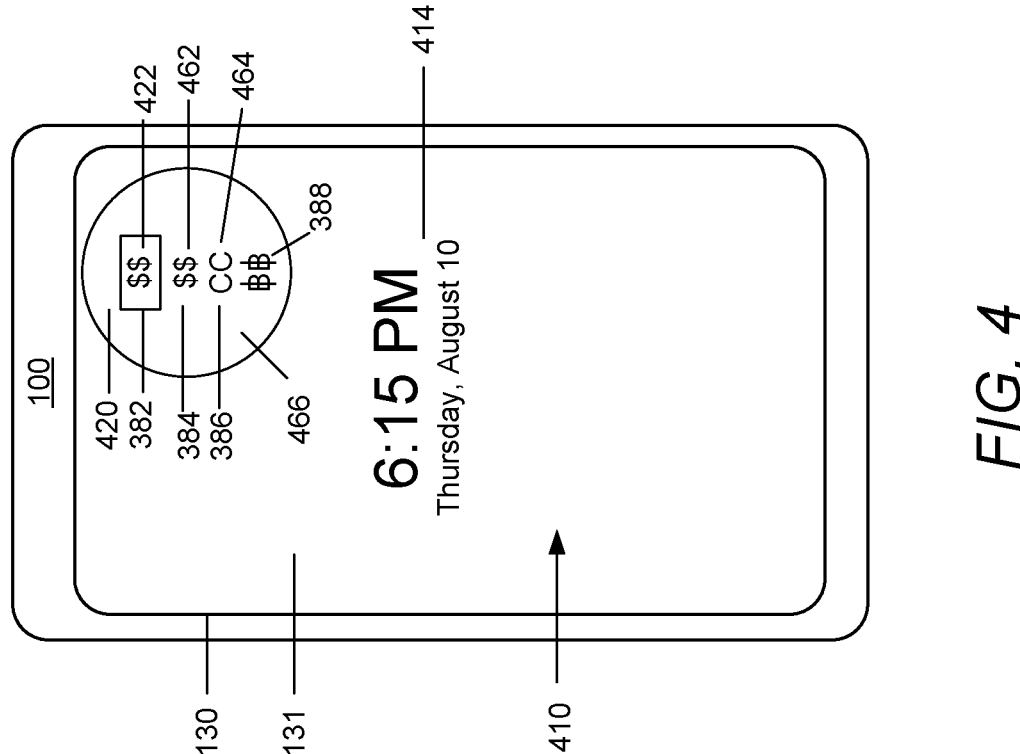
FIG. 4 is an example illustration of a graphical user interface (GUI) presented on a display of an electronic device that includes a balance indicator corresponding to a digital wallet balance, according to one or more embodiments.

With reference to FIG. 4, electronic device 100 is shown with an example graphical user interface (GUI) 410 presented on display 130 with several balance indicators shown in a balance indicator circle 420. In one embodiment, GUI 410 is shown when display 130 of electronic device 100 is in a locked state. GUI 410 includes time and date information 414 and aggregate balance indicator 382. In an example embodiment, aggregate balance indicator 382 can be dollar symbols ($) 422 shown within a rectangle. The number of dollar symbols 422 displayed corresponds to the aggregate digital wallet balance 352 that has been converted into the aggregate balance indicator 382.

In one embodiment, one dollar symbol ($) can represent low aggregate balance range 371, two dollar symbols ($$) can represent moderate aggregate balance range 374, and three dollar symbols ($$$) can represent high aggregate balance range 377. Aggregate balance indicator 382 includes an area 466 around the aggregate balance indicator. In one embodiment, area 466 can be colored to further indicate the balance range shown by the aggregate balance indicator. For example, area 466 can be colored red to represent low aggregate balance range 371, colored yellow to represent moderate aggregate balance range 374, and colored green to represent high aggregate balance range 377. In FIG. 4, aggregate balance indicator 382 is shown with two dollar symbols 422 corresponding to moderate aggregate balance range 374, and area 466 can be colored yellow to represent moderate aggregate balance range 374.

GUI 410 further includes cash balance indicator 384, available credit indicator 386, and available token indicator 388. In an example embodiment, cash balance indicator 384 can be dollar symbols ($) 462 and available credit indicator 386 can be letter "C" symbols 464. The number of dollar symbols 462 displayed corresponds to the digital wallet cash balance 354 that has been converted into the cash balance indicator 384. The number of letter "C" symbols 464 displayed corresponds to the digital wallet available credit 356 that has been converted into the available credit indicator 386.

In one embodiment, one dollar symbol ($) 462 can represent low cash balance range 372, two dollar symbols ($$) 462 can represent moderate cash balance range 375, and three dollar symbols ($$$) 462 can represent high cash balance range 378. One letter "C" symbol (C) 464 can represent low available credit balance range 373, two letter "C" symbols (CC) 464 can represent moderate available credit balance range 376, and three letter "C" symbols (CCC) 464 can represent high available credit balance range 379. In FIG. 4B, cash balance indicator 384 is shown with two dollar symbols 462 corresponding to moderate cash balance range 375, available credit indicator 386 is shown with two letter "C" symbols (CC) 464 corresponding to moderate available credit balance range 376, and available token indicator 388 is shown with two "bitcoin" symbols corresponding to a moderate available token balance. In another embodiment, electronic device 100 can only display aggregate balance indicator 382 or can only display cash balance indicator 384 and available credit indicator 386 on display 130.

FIG. 5 illustrates an example table 502 of balance ranges 370 and the corresponding balance indicators 380 that the balance ranges are converted or mapped to. With specific reference to FIG. 5, low aggregate balance range 371 can be converted into an aggregate balance indicator 382 with one dollar sign ($) within rectangle symbol 510 representing low aggregate balance range 371. In one or more embodiments, rectangular symbol 510 is presented with features to resemble a dollar or other currency bill. Area 466 surrounding the aggregate balance indicator 382 can be colored red to represent the low aggregate balance range 371. Low cash balance range 372 can be converted into cash balance indicator 384 with one dollar sign ($) symbol 510 representing low cash balance range 372. Area 466 surrounding the cash balance indicator 384 can be colored red to represent the low cash balance range 372. Low available credit balance range 373 can be converted into available credit balance indicator 386 with one letter "C" symbol 510 representing low available credit balance range 373. Area 466 surrounding the available credit balance indicator 386 can be colored red to represent the low available credit balance range 373.

Moderate aggregate balance range 374 can be converted into an aggregate balance indicator 382 with two dollar sign ($$) within a rectangle symbol 510 representing moderate aggregate balance range 374. Area 466 surrounding the aggregate balance indicator 382 can be colored yellow to represent the moderate aggregate balance range 374. Moderate cash balance range 375 can be converted into cash balance indicator 384 with two dollar sign ($$) symbols 510 representing moderate cash balance range 375. Area 466 surrounding the cash balance indicator 384 can be colored yellow to represent the moderate cash balance range 375. Moderate available credit balance range 376 can be converted into available credit balance indicator 386 with two letter "C" symbols 510 representing moderate available credit balance range 376. Area 466 surrounding the available credit balance indicator 386 can be colored yellow to represent the moderate available credit balance range 376.

High aggregate balance range 377 can be converted into an aggregate balance indicator 382 with three dollar sign ($$$) within a rectangle symbol 510 representing high aggregate balance range 377. Area 466 surrounding the aggregate balance indicator 382 can be colored green to represent the high aggregate balance range 377. High cash balance range 378 can be converted into cash balance indicator 384 with three dollar sign ($$$) symbols 510 representing high cash balance range 378. Area 466 surrounding the cash balance indicator 384 can be colored green to represent the high cash balance range 378. High available credit balance range 379 can be converted into available credit balance indicator 386 with three letter "C" symbols 510 representing high available credit balance range 379. Area 466 surrounding the available credit balance indicator 386 can be colored green to represent the high available credit balance range 379.

According to an example alternative embodiment, alternative symbols 520 can be used to represent the balance range indicators 380. Alternative symbols 520 are in a bar graph type format to represent the balance range indicators. With continued reference to FIG. 5, low aggregate balance range 371 can be converted into an aggregate balance indicator 382 with one small dollar sign within rectangle symbol 520 representing low aggregate balance range 371. Low cash balance range 372 can be converted into cash balance indicator 384 with one small dollar sign symbol 520 representing low cash balance range 372. Low available credit balance range 373 can be converted into available credit balance indicator 386 with one small letter "C" symbol 520 representing low available credit balance range 373.

Moderate aggregate balance range 374 can be converted into an aggregate balance indicator 382 with a small and medium size dollar sign within a rectangle symbols 520 representing moderate aggregate balance range 374. Moderate cash balance range 375 can be converted into cash balance indicator 384 with small and medium size dollar sign symbols 520 representing moderate cash balance range 375. Moderate available credit balance range 376 can be converted into available credit balance indicator 386 with small and medium size letter "C" symbols 520 representing moderate available credit balance range 376.

High aggregate balance range 377 can be converted into an aggregate balance indicator 382 with small, medium and large size dollar signs within a rectangle symbols 520 representing high aggregate balance range 377. High cash balance range 378 can be converted into cash balance indicator 384 with small, medium, and large size dollar sign symbols 520 representing high cash balance range 378. High available credit balance range 379 can be converted into available credit balance indicator 386 with small, medium, and large size letter "C" symbols 520 representing high available credit balance range 379.

According to one aspect of the disclosure, an electronic device user can select dollar amount values for the low threshold balances and/or low balance ranges, the moderate threshold ranges, and the upper threshold balances and/or high balance ranges for each of the respective cash, available credit, token balances, and aggregate balances.

According to one aspect of the disclosure, electronic device 100 can detect a trigger to initiate the presentation of an indication of the overall digital wallet balances (i.e., one or more overall aggregate balance 352, overall cash balance 354 and/or an overall available credit 356, and/or token balances 348). In response to detecting the trigger to initiate the presentation of the indication of the digital wallet balances, electronic device 100 sends a balance inquiry 230 to the servers of known financial institutions for the digital wallet balances 330 of each of the digital wallet accounts 184, 214, and 224. In applicable scenarios, balance inquiry 230 is also transmitted to the token transaction computer system 250 for their respective available token balances. Electronic device 100 receives a balance inquiry response 240 that contains the digital wallet balance 330 for each of the digital wallet accounts. Electronic device 100 converts the digital wallet balances 330 into balance indicators 380 corresponding to the digital wallet balances, and electronic device 100 outputs the balance indicators 380 within GUI 410 presented on display 130.

According to another aspect of the disclosure, electronic device 100 can combine a total balance from each of multiple digital wallet accounts 184, 214, and 224 to provide an aggregate balance 352, and electronic device 100 presents characteristics of an aggregate balance indicator 382 that correspond to the aggregate balance.

According to an additional aspect of the disclosure, balance indicators 380 provide a visual representation of a monetary amount contained in the digital wallet accounts 184, 214, and 224 without revealing a specific amount in the digital wallet accounts. Token balance indicator 388 can provide a visual representation of token balance 388 contained in the token account 254, without revealing a specific amount in the token account. Information about the type of token can also be kept private.

According to one more aspect of the disclosure, electronic device 100 can monitor, via location sensor 160, for changes in a current location 320 of the electronic device and determine, in part via the current location data received from the location sensor, that the electronic device is being moved away from a pre-identified base location (e.g., home 323A). In response to determining that the electronic device is being moved away from the pre-identified base location, electronic device 100 triggers execution of code of the DWB module 136 that results in presentation of the balance indicators 380 corresponding to the digital wallet balances 350.

According to a further aspect of the disclosure, electronic device 100 can remove the balance indicators 380 from the device display 130 in response to one or more of (i) the electronic device being moved more than a threshold distance 328 away from the pre-established base location (e.g., home 323A) and (ii) expiration of a timer 326, setting a maximum time for displaying the balance indicators 380 or the digital wallet balances 350. In an alternative embodiment, the balance indicators 380 can be removed from GUI 410 when electronic device 100 is detected in a public location, via location sensor 160, or a user can provide user input, via touch screen interface 131, to initiate removing the balance indicators 380 from GUI 410 presented on display 130.

According to another aspect of the disclosure, electronic device 100 can use location sensor 160 to determine that the electronic device is being moved away from the pre-identified base location 323. Electronic device 100 compares a current time with a pre-identified time 327 at which the electronic device is normally moved away from the pre-identified base location 323 by at least the threshold distance 328. Electronic device 100 triggers the execution of the DWB module 136 in response to determining that the electronic device is being moved away from the pre-identified base location 323 at a current time that is within a time range of the pre-identified time 327.

According to another aspect of the disclosure, electronic device 100 can determine if the electronic device has been unlocked and in response to determining that the electronic device has been unlocked, can remove the balance indicators 380 from display 130.

Figure 7:
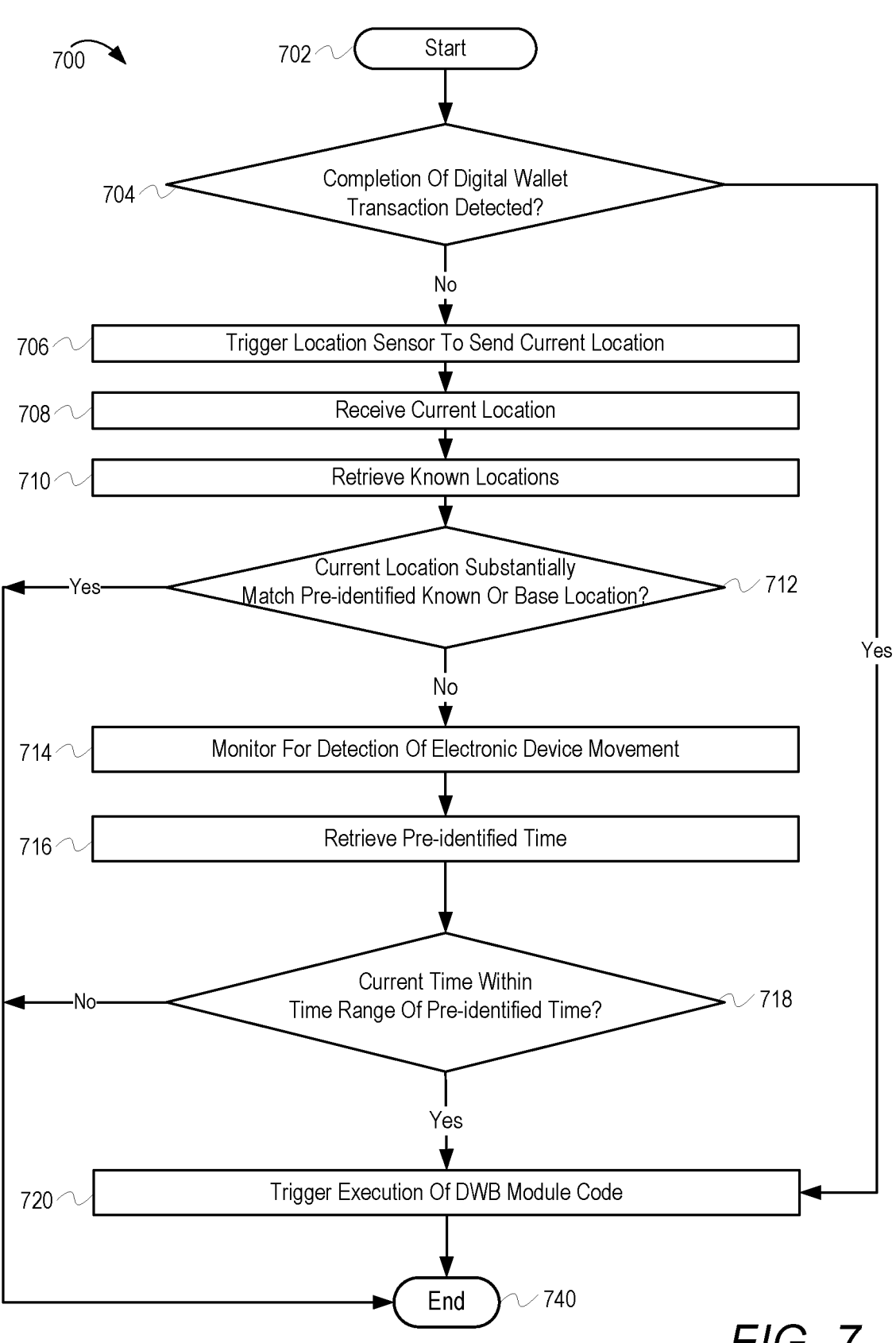
FIG. 7 depicts a flowchart of a method by which an electronic device detects a trigger to initiate indication of a digital wallet balance, according to one or more embodiments.
Figure 8:
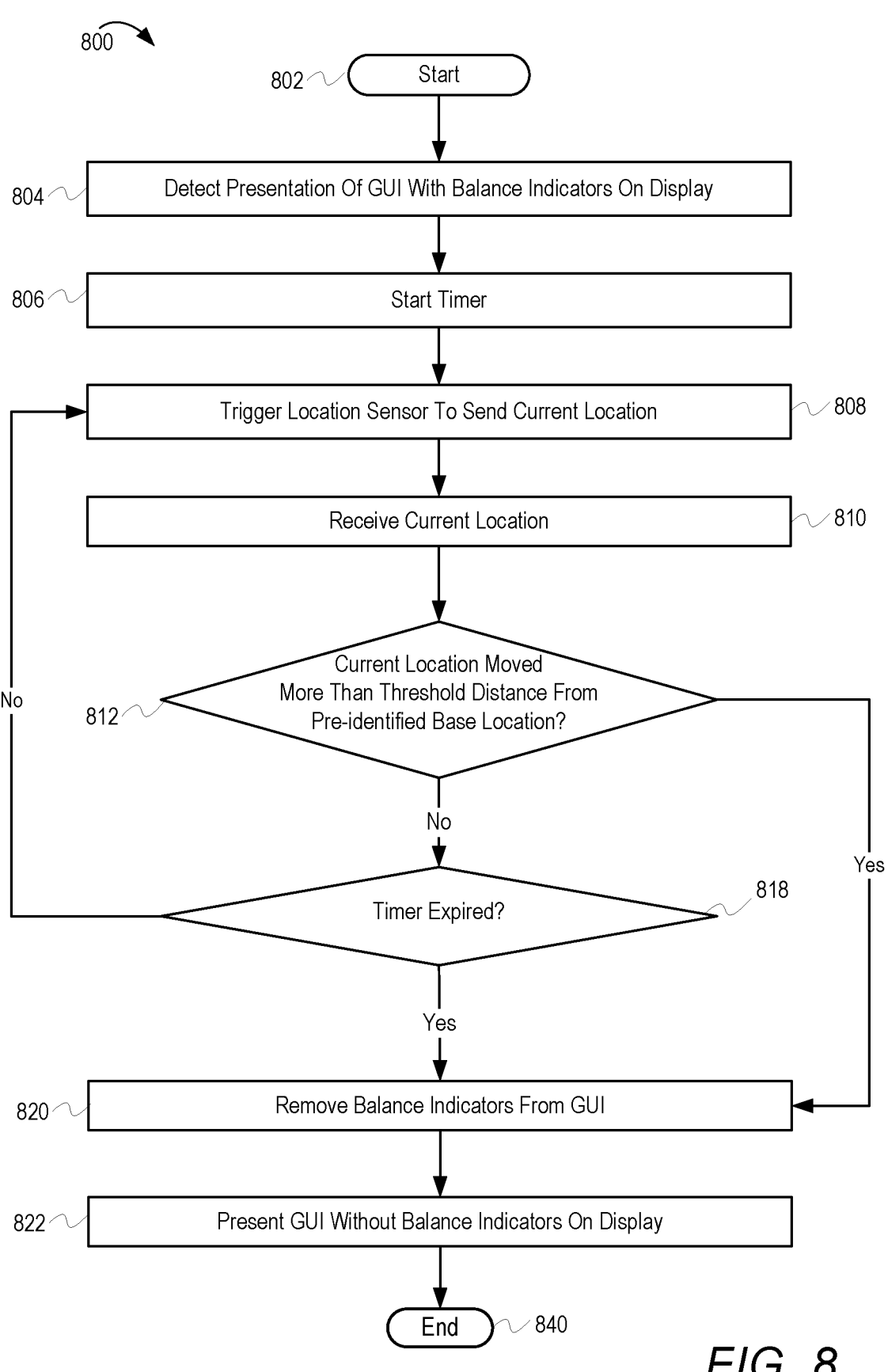
FIG. 8 depicts a flowchart of a method by which an electronic device identifies when to remove a digital wallet balance indicator from being presented on a display, according to one or more embodiments.

FIG. 6 depicts method 600 by which electronic device 100 indicates a digital wallet balance from at least one digital wallet account. FIG. 7 depicts method 700 by which electronic device 100 detects a trigger to initiate indication of a digital wallet balance. FIG. 8 depicts method 800 by which electronic device 100 determines a balance indicator is to be removed from a display. The description of methods 600, 700 and 800 will be described with reference to the components and examples of FIGS. 1-5. The operations depicted in FIGS. 6-8 can be performed by electronic device 100 or any suitable electronic device that includes the one or more functional components of electronic device 100 that provide/enable the described features. One or more of the processes of the methods described in FIGS. 6-8 may be performed by processor 102 executing program code associated with DWB module 136.

With specific reference to FIG. 6, method 600 begins at the start block 602. At block 604, method 600 includes identifying a trigger for calculating and outputting the digital wallet balances 350. In one embodiment, the trigger for calculating and outputting the digital wallet balances 350 can be the electronic device being moved away from the pre-identified base location 323. In another embodiment, the trigger can be completion of a transaction that may result in one or more of the balances falling below a certain pre-established threshold. In response to identifying the trigger, method 600 includes sending a balance inquiry 230 for the digital wallet balances 330 of each of the digital wallet accounts 184, 214 and 224 and token balance 348 to the digital wallet financial institution computer systems 180, 210 and 220 and the token transaction computer system 250 (block 606). At block 608, the method includes receiving a balance inquiry response 240 from the digital wallet financial institution computer systems 180, 210 and 220 and the token transaction computer system 250 containing the digital wallet balances 330 of the digital wallet accounts 184, 214 and 224 and token balance 348. The received digital wallet balances 330 include cash balances 334, 340 and 346 and available credit balances 336, 342 and 348 for each respective digital wallet account.

Method 600 further includes separately identifying the digital wallet cash balances 334, 340 and 346 and available credit balances 336, 342 and 348 from the response to the balance inquiry (block 610) and calculating a total or overall cash balance 354, overall available credit balance 356 and overall aggregate balance 352 (block 612). In one or more embodiments, the digital wallet cash balances 334, 340 and 346 are summed to calculate overall cash balance 354, the digital wallet available credit balances 336, 342 and 348 are summed to calculate overall available credit balance 356, And the overall cash balance 354 and overall available credit balance 356 are summed to calculate overall aggregate balance 352.

At block 614, threshold balances 360 are retrieved from system memory 120. Method 600 further includes converting or assigning each of the overall balances (e.g. overall aggregate balance 352, overall cash balance 354, and overall available credit balance 356) to respective balance ranges 370 (block 616). In an example embodiment, if the overall aggregate balance 352 is less than low threshold aggregate balance 361, processor 102 can assign the overall aggregate balance 352 as being in the low aggregate balance range 371. If the overall aggregate balance 352 is greater than upper threshold aggregate balance 366, processor 102 can assign the overall aggregate balance 352 as being in the high aggregate balance range 377. If the overall aggregate balance 352 is between low threshold aggregate balance 361 and upper threshold aggregate balance 366, processor 102 can assign the overall aggregate balance 352 as being in the moderate aggregate balance range 374.

Method 600 further includes converting the assigned balance ranges 370 to respective balance indicators 380 (block 618). The assigned balance ranges 370 for cash, available credit, and aggregate ranges are each converted to respective aggregate balance indicator 382, cash balance indicator 384, and available credit indicator 386. In an example embodiment, if the overall aggregate balance 352 is in the moderate aggregate balance range 374, the moderate aggregate balance range 374 is converted into an aggregate balance indicator 382 with symbol 510 as two dollar signs ($$) within a rectangle and a yellow color code 466 is applied.

At block 620, aggregate balance indicator 382, cash balance indicator 384, and available credit indicator 386 are outputted or presented within GUI 410 on display 130. In one embodiment, token balance indicator 388 can also be presented within GUI 410 on display 130. The presented GUI 410 can include a visual representation with symbols 510 and color codes 466 corresponding to aggregate balance indicator 382, cash balance indicator 384, and available credit indicator 386. Method 600 terminates at end block 640.

FIG. 7 illustrates method 700 presenting possible triggers that can cause the electronic device to retrieve the available cash and credit balances from the financial institutions and calculate and display the available balances using pre-assigned symbols, according to one or more embodiments. With specific reference to FIG. 7, method 700 begins at the start block 702. At decision block 704, the method includes determining if a digital wallet transaction 312 has been completed. In response to determining that at least one digital wallet transaction 312 has not been completed, method 700 further includes triggering location sensor 160 to send current location 320 of electronic device 100 (block 706), and receiving current location 320 of electronic device 100 from the location sensor 160 (block 708). At block 710, at least one known location 322 is retrieved from system memory 120. Known locations 322 include base locations 323 that are pre-identified locations that electronic device 100 is known to be frequently kept at or located at. For example, one of the base locations 323 can be home 323A. Method 700 further determines if the current location 320 substantially matches at least one pre-identified known location 322 or a base location 323 (e.g. base location home 323A) (decision block 712).

In response to determining that the current location 320 substantially matches at least one known location 322, method 700 includes initiating monitoring, via a location sensor (e.g., GPS sensor), for detection of device movement away from the known location (block 714). In one embodiment, electronic device 100 monitors, via location sensor 160, for changes in current location 320 of the electronic device, and electronic device 100 determines, in part via the current location data received from the location sensor, that the electronic device is being moved away from a pre-identified known location or base location.

In response to determining that the electronic device is being moved away from the pre-identified base location 323, method 700 includes retrieving pre-identified times 327 from system memory 120 (block 716) and comparing a current time with a corresponding pre-identified time 327 at which the electronic device is normally moved away from the pre-identified base location 323 by at least the threshold distance 328 to determine if the current time is within a time range of the pre-identified time 327 (decision block 718).

When electronic device 100 determines that the electronic device is being moved away from the pre-identified base location 323, electronic device 100 compares a current time with a pre-identified time 327 at which the electronic device is normally moved away from the pre-identified base location 323 by at least the threshold distance 328. This check allows for the device to ascertain that the user is about to embark on a journey that may require the user be aware of his/her account balances before the user leaves the known location.

In response to determining that current time is not within a time range of the pre-identified time 327, method 700 ends at end block 740. In response to determining that current time is within a time range of the pre-identified time 327, or in response to determining that at least one digital wallet transaction 312 has been completed (decision block 704), method 700 further includes triggering the execution of DWB module 136 code (block 720) to perform the processes of FIG. 6. Method 700 terminates at end block 740.

FIG. 8 depicts one example method 800 by which electronic device 100 determines a balance indicator is to be removed from a display. With reference to FIG. 8, method 800 begins at the start block 802. At block 804, the method includes detecting start of presentation of GUI 410 with balance indicators 380 on display 130. Method 800 further includes starting timer 326 in response to detecting presentation of balance indicators 380 within GUI 410 (block 806).

Method 800 includes triggering location sensor 160 to send the current location 320 of electronic device 100 (block 808) and receiving the current location 320 from the location sensor (block 810). Method 800 further includes determining if the current location of electronic device corresponds to the device having been moved more than a threshold distance 328 away from the pre-identified base location 323 (decision block 812).

In response to determining that the current location 320 of the electronic device corresponds to having been moved more than threshold distance 328 away from the pre-identified base location 323, method 800 includes removing balance indicators 380 from GUI 410 (block 820) and presenting the remaining GUI on display 130 without the balance indicators (block 822). Method 800 then terminates at end block 840.

In response to determining that the current location 320 of the electronic device corresponds to the device not having been moved more than threshold distance 328 away from the pre-identified base location 323, method 800 further includes monitoring for expiration of timer 326 and determining if timer 326 has expired (decision block 818). In response to determining that timer 326 has not expired, method 800 returns to block 808 to continue monitoring the current location of the electronic device. In response to determining that timer 326 has expired, the balance indicators 380 are removed from GUI 410 (block 820) and the remaining GUI is presented on display 130 without the balance indicators (block 822). Method 800 then ends at end block 840.

In an alternative embodiment, the balance indicators 380 can be removed from GUI 410 when electronic device 100 is detected in a public location, via location sensor 160, or a user can provide user input, via touch screen interface 131, to initiate removing the balance indicators 380 from GUI 410 presented on display 130.

In the above-described methods of FIGS. 6, 7 and 8, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

a display;

a communication subsystem;

a location sensor which reports a current location of the electronic device;

a memory having stored thereon a digital wallet balance (DWB) module for indicating a digital wallet balance from at least one digital wallet account; and at least one processor communicatively coupled to the display, the communication subsystem, the location sensor, and the memory, the at least one processor executing program code of the digital wallet balance module, and is configured to cause the electronic device to:

monitor, via the location sensor, for changes in the current location of the electronic device;

detect a trigger to initiate indication of the digital wallet balance, wherein the trigger is a device-location-changing trigger associated with movement of the electronic device away from a pre-identified location, and to detect the trigger to initiate indication of the digital wallet balance, the at least one processor determines, in part based on current location data received from the location sensor, that the electronic device is being moved away from the pre-identified location;

in response to determining that the electronic device is being moved away from the pre-identified base location, triggers execution of code of the DWB module that results in presentation of the first balance indicator corresponding to the digital wallet balance;

in response to detecting the trigger to initiate indication of the digital wallet balance, transmit, via the communication subsystem through a communication network to one or more computer systems of a respective one or more financial institutions and token transaction systems, a balance inquiry for the digital wallet balance of each of the at least one digital wallet account;

receive, in response to the balance inquiry, via the communication system from the computer systems through the communication network, network transmitted digital wallet balance for each of the at least one digital wallet account;

convert the digital wallet balance into a first balance indicator corresponding to the digital wallet balance; and output the first balance indicator within a first graphical user interface (GUI) presented on the display.

2. The electronic device of claim 1, wherein the at least one digital wallet account comprises multiple digital wallet accounts, and the at least one processor:

combines a total balance from each of the multiple digital wallet accounts to provide an aggregate balance; and presents characteristics of the first balance indicator that correspond to the aggregate balance.

3. The electronic device of claim 1, wherein the at least one processor:

identifies a digital wallet cash balance and a digital wallet available credit from the response to the balance inquiry;

converts the digital wallet cash balance into a cash balance indicator representing the digital wallet cash balance; and converts the digital wallet available credit into an available credit indicator representing the digital wallet available credit; and presents both the cash balance indicator and the available credit indicator within the GUI presented on the display.

4. The electronic device of claim 1, wherein the first balance indicator provides a visual representation of a monetary amount contained in the at least one digital wallet account without revealing a specific amount in the at least one digital wallet account.

5. The electronic device of claim 4, wherein the visual representation indicates a balance range that is one of:

a first balance range that is less than a low threshold balance;

a second balance range that is between the low threshold balance and an upper threshold balance; and a third balance range that is greater than the upper threshold balance.

6. The electronic device of claim 1, wherein to detect the trigger to initiate indication of the digital wallet balance, the at least one processor:

detects completion of at least one digital wallet transaction; and in response to detecting completion of the at least one digital wallet transaction, initiates retrieval of and indication of the digital wallet balance.

7. The electronic device of claim 1, wherein the at least one processor is further configured to cause the electronic device to:

remove the first balance indicator from the device display in response to one or more of (i) the electronic device being moved more than a threshold distance away from the pre-established base location and (ii) expiration of a timer that sets a maximum time for displaying the first balance indicator or the digital wallet balance.

8. The electronic device of claim 7, wherein to determine that the device is being moved away from the pre-identified base location, the processor:

compares a current time with a pre-identified time at which the electronic device is normally moved away from the pre-identified base location by at least the threshold distance; and triggers the execution of the code in response to determining that the electronic device is being moved away from the pre-identified base location at a current time that is within a time range of the pre-identified time.

9. The electronic device of claim 1, wherein the at least one processor:

determines if the electronic device has been unlocked; and in response to determining that the electronic device has been unlocked, removes the first balance indicator from the display.

10. The electronic device of claim 1, wherein the at least one processor is further configured to cause the electronic device to:

start a timer in response to presenting the first balance indicator within the first GUI;

monitor for expiration of the timer; and in response to determining that the timer has expired, remove the first balance indicator from the display.

11. A method comprising:

monitoring for changes in the current location of an electronic device;

detecting, via at least one processor of the electronic device, a trigger to initiate indication of a digital wallet balance, wherein the trigger is a device-location-changing trigger associated with movement of the electronic device away from a pre-identified location, and detecting the trigger to initiate indication of the digital wallet balance comprises determining, in part based on current location data received from a location sensor, that the electronic device is being moved away from the pre-identified location;

in response to determining that the electronic device is being moved away from the pre-identified base location, triggering execution of code of the DWB module that results in presentation of the first balance indicator corresponding to the digital wallet balance;

in response to detecting the trigger to initiate indication of the digital wallet balance, transmitting a balance inquiry for the digital wallet balance of each of the at least one digital wallet account;

receiving, in response to the balance inquiry, via the communication system from the computer systems through the communication network, network transmitted digital wallet balance for each of the at least one digital wallet account;

converting the digital wallet balance into a first balance indicator corresponding to the digital wallet balance; and outputting the first balance indicator within a first graphical user interface (GUI) presented on the display.

12. The method of claim 11, wherein the at least one digital wallet account comprises multiple digital wallet accounts, the method further comprising:

combining a total balance from each of the multiple digital wallet accounts to provide an aggregate balance; and presenting characteristics of the first balance indicator that correspond to the aggregate balance.

13. The method of claim 12, further comprising:

identifying a digital wallet cash balance and a digital wallet available credit from the response to the balance inquiry;

converting the digital wallet cash balance into a cash balance indicator representing the digital wallet cash balance; and converting the digital wallet available credit into an available credit indicator representing the digital wallet available credit; and presenting both the cash balance indicator and the available credit indicator within the GUI presented on the display.

14. The method of claim 11, wherein the first balance indicator provides a visual representation of a monetary amount contained in the at least one digital wallet account without revealing a specific amount in the at least one digital wallet account.

15. The method of claim 14, wherein the visual representation indicates a balance range that is one of:

a first balance range that is less than a low threshold balance;

a second balance range that is between the low threshold balance and an upper threshold balance; and a third balance range that is greater than the upper threshold balance.

16. The method of claim 11, wherein to detect the trigger to initiate indication of the digital wallet balance, the method further comprises:

detecting completion of at least one digital wallet transaction; and in response to detecting completion of the at least one digital wallet transaction, initiating retrieval of and indication of the digital wallet balance.

17. The method of claim 11, further comprising:

removing the first balance indicator from the device display in response to one or more of (i) the electronic device being moved more than a threshold distance away from the pre-established base location and (ii) expiration of a timer, setting a maximum time for displaying the first balance indicator or the digital wallet balance.

18. The method of claim 17, wherein to determine that the device is being moved away from the pre-identified base location, the method further comprises:

comparing a current time with a pre-identified time at which the electronic device is normally moved away from the pre-identified base location by at least the threshold distance; and triggering the execution of the code in response to determining that the electronic device is being moved away from the pre-identified base location at a current time that is within a time range of the pre-identified time.

19. The method of claim 11, further comprising:

starting a timer in response to presenting the first balance indicator within the first GUI;

monitoring for expiration of the timer; and in response to determining that the timer has expired, removing the first balance indicator from the display.

20. A computer program product comprising:

a non-transitory computer readable storage device having stored thereon program code which, when executed by at least one processor of an electronic device having a display, a communication system, and a memory, enables the electronic device to complete the functionality of:

monitoring for changes in the current location of an electronic device;

detecting a trigger to initiate indication of a digital wallet balance, wherein the trigger is a device-location-changing trigger associated with movement of the electronic device away from a pre-identified location, and detecting the trigger to initiate indication of the digital wallet balance comprises determining, in part based on current location data received from a location sensor, that the electronic device is being moved away from the pre-identified location;

in response to determining that the electronic device is being moved away from the pre-identified base location, triggering execution of code of the DWB module that results in presentation of the first balance indicator corresponding to the digital wallet balance;

in response to detecting the trigger to initiate indication of the digital wallet balance, sending a balance inquiry for the digital wallet balance of each of the at least one digital wallet account;

receiving, in response to the balance inquiry, the digital wallet balance for each of the at least one digital wallet account;

converting the digital wallet balance into a first balance indicator corresponding to the digital wallet balance; and outputting the first balance indicator within a first graphical user interface (GUI) presented on the display.

* * * * *